April 18, 1967  J. W. FORBES  3,314,221
COTTONPICKER

Filed Aug. 3, 1964  5 Sheets-Sheet 1

INVENTOR
John W. Forbes
BY Alexander McDowell
ATTORNEYS

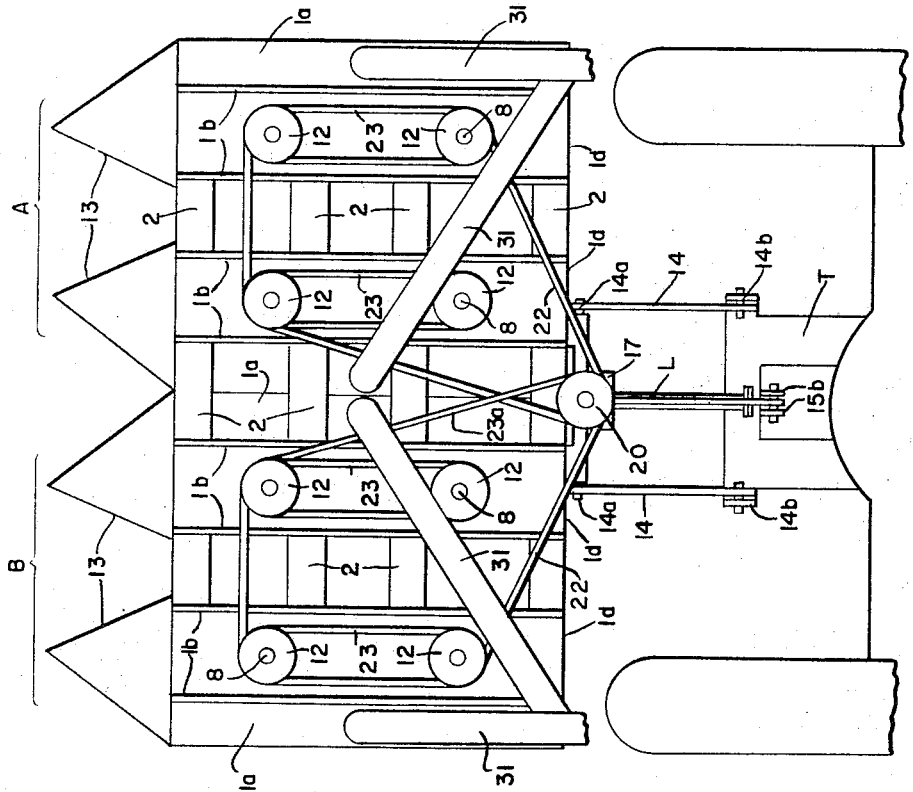
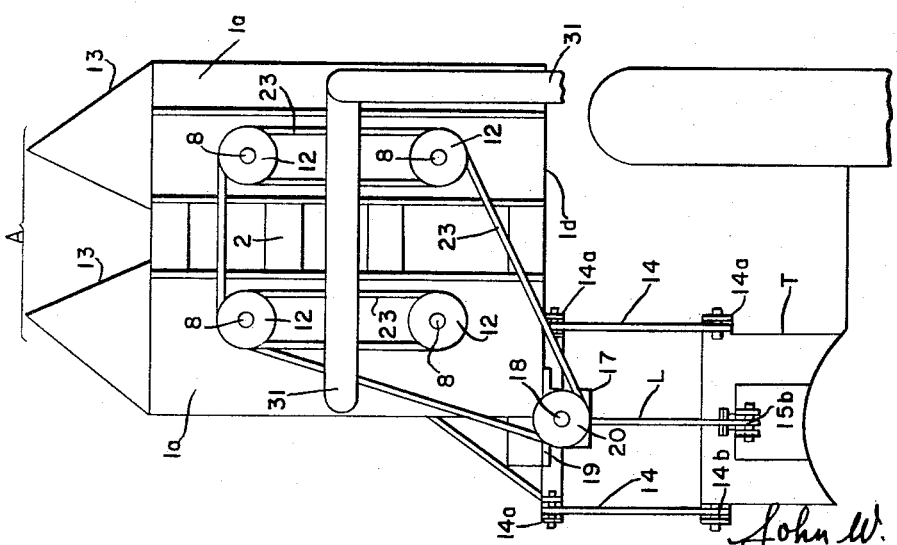
INVENTOR
John W. Forbes
BY Alexander Howell
ATTORNEYS

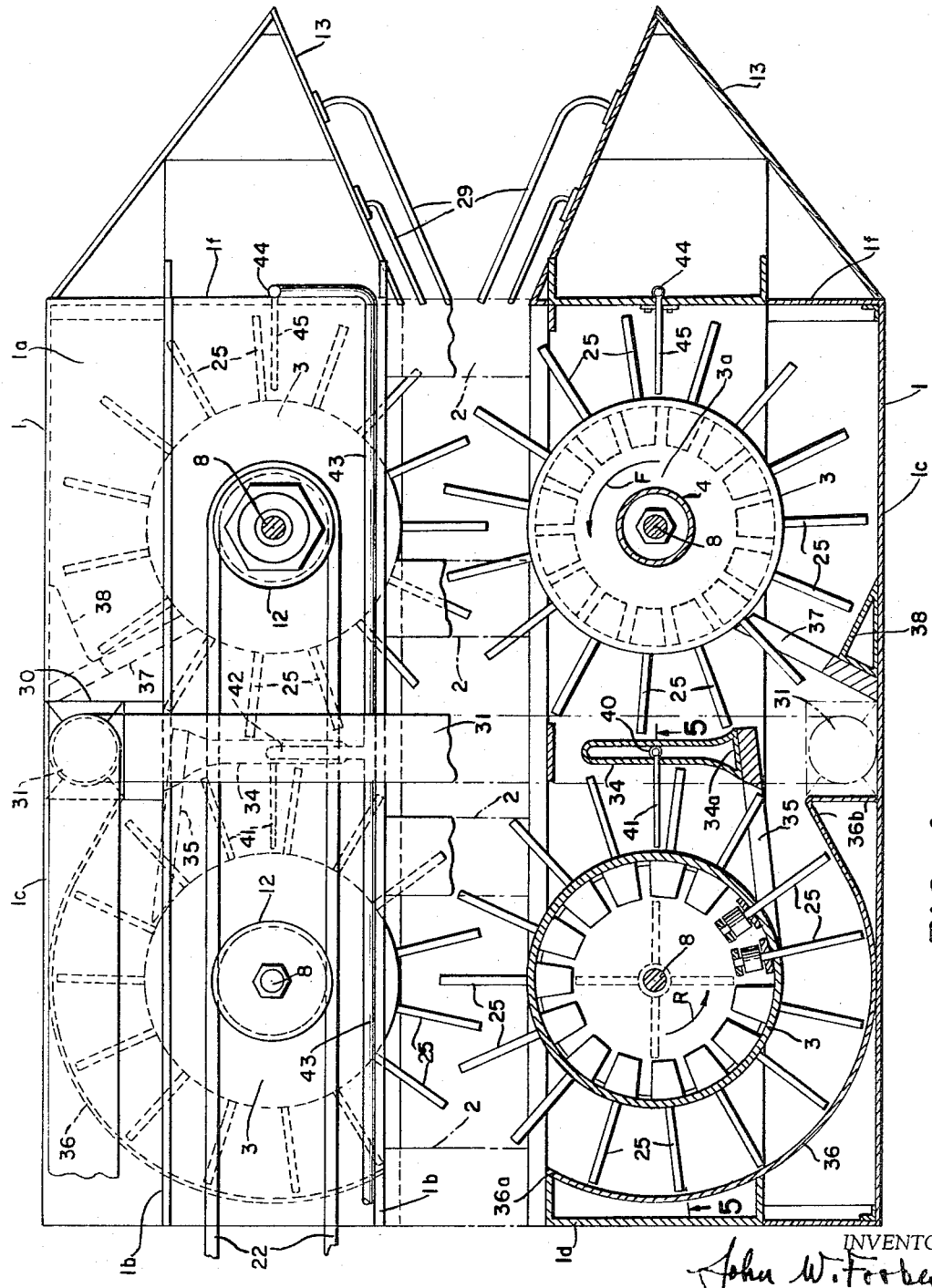

United States Patent Office 3,314,221
Patented Apr. 18, 1967

3,314,221
COTTONPICKER
John W. Forbes, Cleveland, Miss., assignor of one-half to Wm. B. Alexander, Preston Riley, and J. E. Wolfe, all of Cleveland, Miss.
Filed Aug. 3, 1964, Ser. No. 386,872
19 Claims. (Cl. 56—44)

This invention is a novel cottonpicker, and the principal object of the invention is to provide single or multiple cottonpicker units adapted to be mounted on a tractor having a power output shaft, each unit being adapted to straddle a row of cotton plants as the tractor is moved along the row, the unit being provided with pickers which strip the cotton from the bolls of the plants, and provided with doffers which remove the picked cotton from the strippers and which doffers discharge or deliver the cotton into suction ducts in the unit through which the stripped cotton is pneumatically discharged into a receptacle mounted upon the tractor; the invention including a single unit to strip one row, or multiple units to strip multiple parallel and adjacent rows simultaneously.

Another object of the invention is to provide a cottonpicker of the above type including certain novel features of contruction and operation hereinafter set forth.

I will explain the invention with reference to the accompanying drawings, which illustrate one practical embodiment thereof, to enable others familiar with the art to adopt and use the same; and will summarize in the claims, the novel features of construction, and novel combination of parts, for which protection is desired.

In said drawings:

FIG. 2 is a top plan view of a single unit mounted upon the rear end of the tractor.

FIG. 3 is a view similar to FIG. 2 but showing a double unit mounted on the rear end of the tractor.

FIG. 4 is an enlarged top plan view, partly in section, of the single unit shown in FIG. 2.

Figure 1:
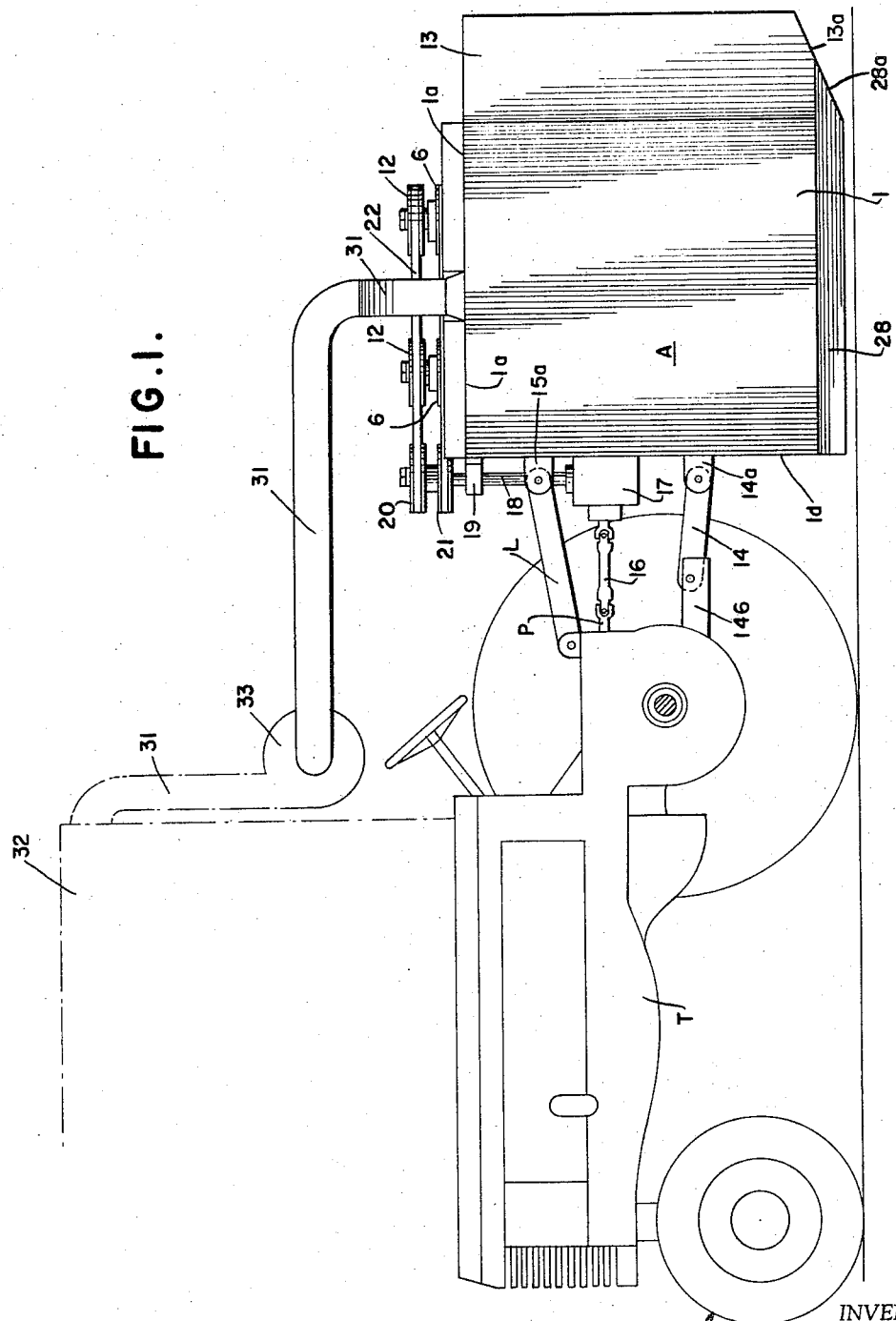
FIG. 1 is a side elevation of my novel cottonpicker mounted on a tractor, and showing in dot-and-dash lines the cotton receiving receptacle carried by the tractor.

As shown in FIG. 1, my novel cottonpicker is adapted to be supported at the rear end of a conventional wheeled tractor T, said tractor being provided with the customary power take-off shaft P, and with a power lift-arm L, each unit consisting of spaced parallel rectangular casings 1 which are held in spaced parallel relation by means of bars 2 secured to the tops thereof, as shown in FIGS. 2, 3 and 4, FIG. 2 showing a single unit A adapted to straddle a single row of cotton plants, while FIG. 3 shows a pair of units A–B for straddling two parallel rows of cotton plants as the tractor is backed along the rows of cotton plants straddled by the units A–B.

Figure 5:
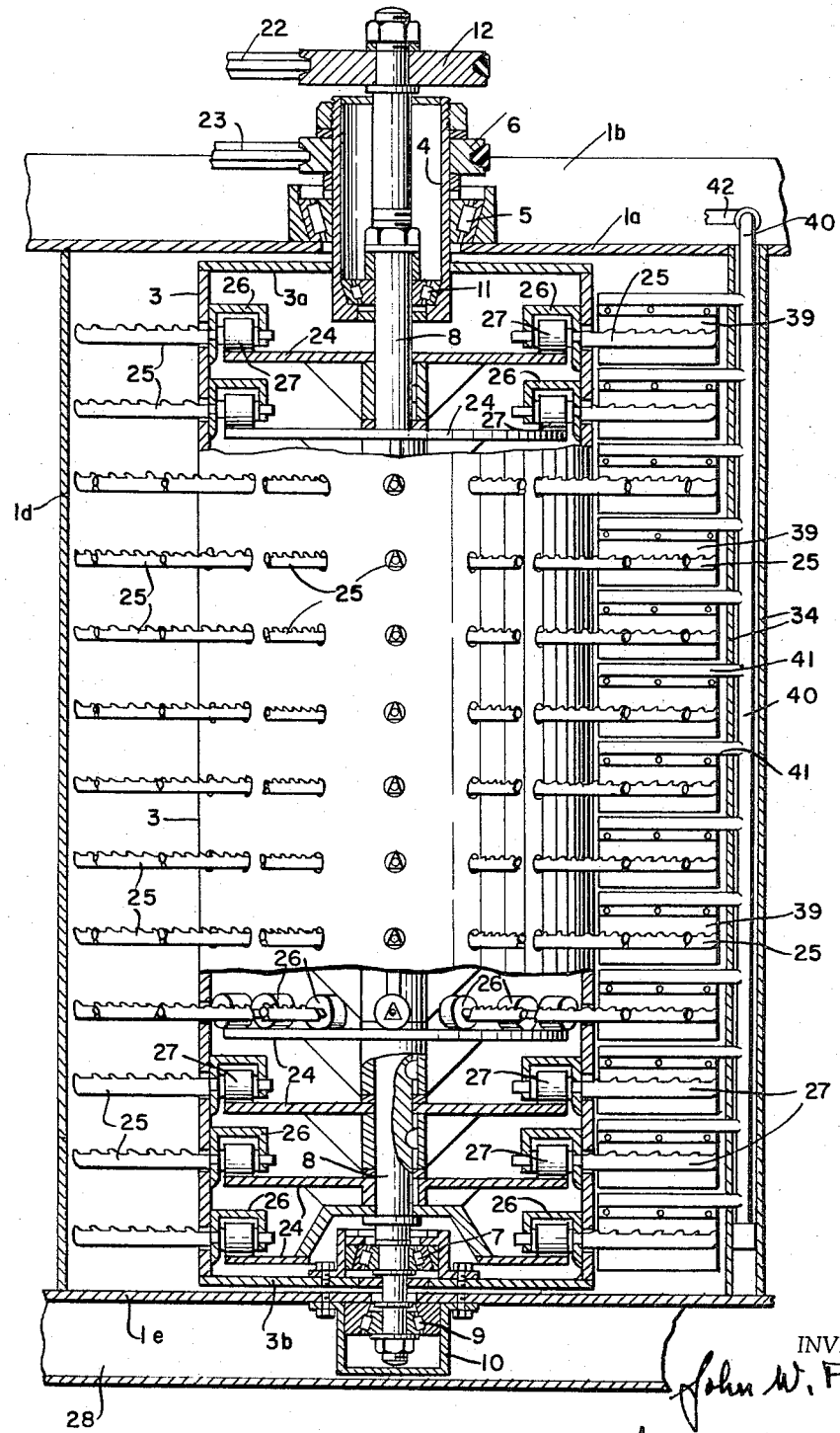
FIG. 5 is an enlarged vertical section through the rear portion of one side of the single unit taken on the line 5—5, FIG. 4, showing the assembly of parts.

Each unit A or B consists of two spaced rectangular casings 1 each having a top plate 1a, FIG. 5, upon which is secured a longitudinally disposed channel iron 1b, and each casing 1 has an outer side plate 1c, a rear end plate 1d, bottom plate 1e, and a front plate 1f, the casing 1 being elongated in axial direction of the tractor. The inner side of each casing 1 is substantially open, for the purpose hereinafter set forth.

Each casing 1 rotatably supports two spaced rotatable drums 3, as shown in FIG. 4, which drums each carry a plurality of radially disposed rotatable picker fingers 25, the picker fingers being of such length that they overlap within the space between the casings 1 of each unit A and B, as shown in FIG. 4, and the fingers 25 being adapted to automatically pick the cotton from the bolls of the plants between the casings 1 of each unit as the unit 6 moves along the row of cotton plants.

Each drum 3 has a head 3a, FIG. 5, removably secured to the drum 3, and has a central bore which is secured to a rotatable hollow stub shaft 4, FIG. 5, which extends through the channel iron 1b and is rotatable in a conical roller bearing 5, FIG. 5, secured upon the web of the channel 1b, as shown in FIG. 5, said stub shaft 4 carrying above the bearing 5 a belt pulley 6, FIG. 5, for the purpose hereinafter described. Any suitable means for grease-packing the bearing 5 may be provided, as desired.

The lower end of each drum 3 is closed by a plate 3b, FIG. 5, and is journaled in a conical roller bearing on plate 3b similar to but smaller than the bearing 5, through which bearing 7 extends an inner rotatable shaft 8, FIG. 5, coaxial with the drum 3. The lower end of the shaft 8, as shown in FIG. 5, extends through an opening in the bottom plate 1e of the casing 1 and is journaled in a conical roller bearing 9, FIG. 5, enclosed in a casing 10. Any desired means for grease-packing the bearings 7 and 9 may be provided. The upper end of the inner shaft 8, as shown in FIG. 5, is journaled in a conical roller bearing 11 mounted in the lower end of the hollow stub shaft 4, and may be grease-packed in any desired manner.

By the above construction the drum 3 may freely rotate within the casing 1 on the stub shaft 4 and in bearing 7 while the inner shaft 8 is freely rotatable within the drum 3 in the bearings 9 and 11. On the upper end of the inner shaft 8, above the top of the stub shaft 4, is a belt pulley 12 for the purpose hereinafter described.

By the above construction the drum 3 may freely rotate within the casing 1 on the stub shaft 4 and in bearing 7 while the inner shaft 8 is freely rotatable within the drum 3 in the bearings 9 and 11. On the upper end of the inner shaft 8, above the top of the stub shaft 4, is a belt pulley 12 for the purpose hereinafter described.

At the front of each casing 1 in advance of the front plate 1f, FIGS. 2, 3, 4 and 6, are triangular guide plates 13 embracing the entire width of the front plates 1f and secured thereto in any desired manner, the lower ends of the guide plates 13, as shown in FIG. 1, being inclined upwardly as at 13a to assist the units A–B in passing above but closely adjacent to the ground surface.

As shown in FIGS. 1 and 2, the unit A is disposed at one side of the axis of tractor T and is supported by means of lower links 14 each having one end secured to the rear end plate 1d of the casing 1, and their other ends secured to brackets 14b carried by the tractor T; and by the tractor lift-arm L having its end secured to bracket 15a mounted on the end plate 1d of the casing 1, whereby as the lift-arm L is raised or lowered the unit A or B will be raised or lowered with respect to the ground surface. Where two units A and B are carried by the tractor T, as shown in FIG. 3, a similar arrangement of links 14 is provided; and thus a single unit A may be supported when only one unit is to be used, or double units A and B may be supported, as desired.

Power to rotate the drums 3 and the shaft 8 is derived from the power take-off shaft P of the tractor, as shown in FIG. 1, said power take-off shaft P being connected by a flexible shaft 16 having universal joints at its end and driving through suitable gearing in a gear box 17 a vertical shaft 18, FIG. 1, journaled in bearing 19 and extending above the top 1a of the casing 1, the bearing 19 and gear box 17 being secured to the end plate 1d of the units A or B.

On the upper end of the vertical shaft 18 is an upper pulley 20 and a lower pulley 21, and as shown in FIG. 2, around the pulley 20 and around the pulleys 12 on the upper ends of the inner shafts 8 of each casing 1 runs a belt 22 thereby driving the inner shafts 8 of the units A from the power pulley 20 in the same direction and at the same speed. The drums 3 of each unit A are simultaneously rotated by belts 23 which run around the pulleys 6 on the drum shafts 4 of each casing and around the lower pulley 21 on the power shaft 18.

Within each drum B on the shaft 1 are keyed a plurality of disks 24, FIG. 5, in spaced relationship for the purpose of rotating the cotton picking fingers 25 which extend radially through perforations in the wall of the drum 3, as clearly shown in FIG. 5. As shown, each picker finger 25 is of substantial length and extends radially through a hole in the drum 3 and has its inner end journaled in U-shaped brackets 26 having one leg secured to the wall of the drum 3 adjacent the opening, each finger 25 carrying within the bosom of the bracket 26 a roller 27 contacting its related disk 24, whereby as the disk 24 is rotated by shaft 8 the related finger 25 will be rotated to pick the cotton from the boll of the cotton plants as the unit A or B passes along the row of cotton plants.

Figure 6:
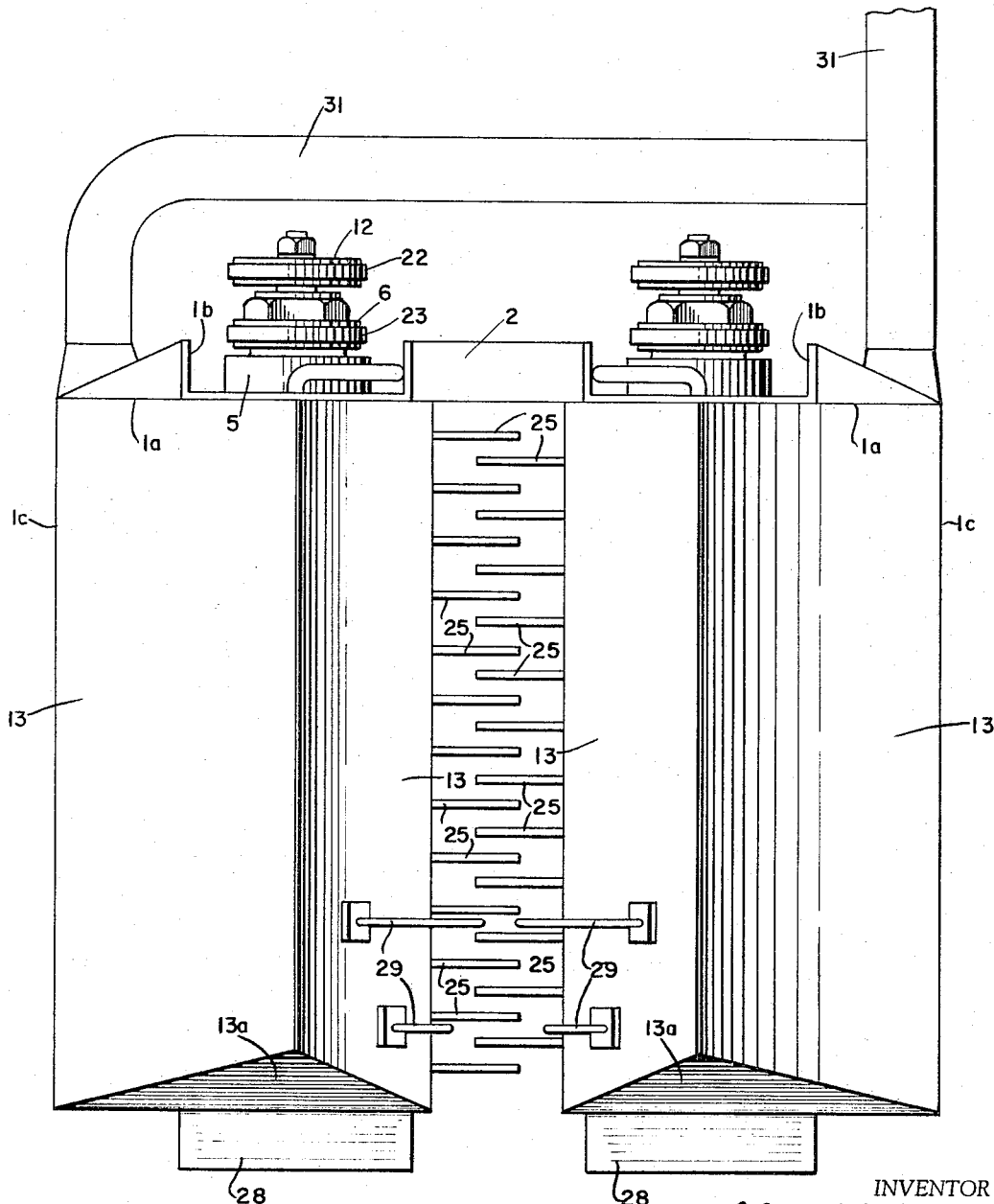
FIG. 6 is an enlarged front elevational view of the single unit, shown in FIG. 2.

A longitudinally extending skid or runner 28, FIG. 6, is provided on the underside of each casing 1 to assist the unit in passing over an obstruction in the filed in event same contacts the obstruction, the front end of the runner being preferably beveled upwardly as at 28a, FIG. 1, forming a continuation of the bevel 13a of the triangular guide plates 13 hereinbefore referred to; and preferably between adjacent inclined faces of the guides 13 are rearwardly inclined springy guide rods 29, FIGS. 4 and 6, adapted to partially lift and compress the cotton plants as they enter between the spaced casings 1 of the units A or B, to assist in proper guiding or positioning of the cotton plants preparatory to the picking operation.

Within each casing 1, between the related front drum and rear drum 3, and disposed at the outer side wall 1c of the unit, is a rectangular air duct 30, FIG. 4, which is open at its bottom and mounted on the side wall 1c with its open lower end spaced somewhat above the floor 1e of the casing, said rectangular duct 30 changing into a circular duct 31, FIG. 4, extending over the top of the units A or B as shown in FIG. 2, and continuing to a cotton receiving tank 32, FIG. 1, mounted upon the tractor T, a suction fan in a housing 33, FIG. 1, disposed in the duct 31, whereby the cotton in each of the casings 1 of each unit A–B may be conducted through the duct 31 and deposited in the receptacle 32.

As shown in FIG. 4, between the front and rear drums 3 of each casing 1, is a separator 34 which, as shown in FIG. 4, is hollow and is spaced from the air duct 31 and has its side faces formed substantially arcuate so as to clear the tips of the picking fingers 25 of each drum 3. The separator 34 is preferably fastened at its top and bottom to the top plate 1a and bottom plate 1e of each casing 1, and the separator 34 has its end 34a opposite from the open side of the casing 1 formed at an angle to the longitudinal axis of the casing 1 and serves as a support for a rear drum doffer 35, FIG. 4, which has its outer end arcuately curved and lying closely adjacent the surface of the related drum 3, as shown in FIG. 4, the doffers 35 being associated with each horizontal row of cotton pickers 35 and serving to remove the cotton from the pickers 25 when the drum is rotating in the direction indicated by the arrow R, FIG. 4, and thereby deposit the cotton which is removed from the pickers 25 adjacent and substantially at the lower open end of the air duct 30–31 to be sucked up into the air duct 31 and transferred by suction into the cotton receiving receptacle 32.

Associated with the rear drum 3 of each casing 1 of the units A and B is a rear wall consisting of an arcuate plate 36, FIG. 4, spaced slightly from the outer tips of the picking fingers 25 of the related drum 3, said plate 36 having its axis of curvature the same as that of the related drum 3, and extending from a point 36a at the open side of the casing 1 to a point 36b adjacent the air duct 31, the top and bottom of the wall 36 being secured in any desired manner to the top 1a and bottom 1e of the casing 1. As shown in FIG. 4, the point 36b of the wall 36 is spaced from the rear doffer 35, leaving a space therebetween whereby the cotton which is doffed by doffers 35 from the picking fingers 25 may fall and collect adjacent the open lower end of the air duct 30–31.

The doffer 37 for the front drum 3 of each unit as shown in FIG. 4 is set at an angle to the related drum 3, and is secured to the outer side wall 1c of the unit by a triangular bracket 38, FIG. 4, disposed adjacent the air duct 30–31, whereby when the front drum 3 of the unit is rotating in the direction of the arrow F, FIG. 4, the cotton on the related picking fingers 25, upon reaching the front doffer 37, will be removed from the pickers 25 and deposited closely adjacent the lower open end of the air duct 30–31, and will be caught up by the suction within the duct 31 and delivered through ducts 31 by suction into the cotton receiving receptable 32.

Preferably the doffers 35–37 are formed of rubber so as to be somewhat flexible, rubber having better qualities for stripping the cottom from the spindles; but being formed of rubber the doffers would be capable of yielding. If a choked or bent spindle 25 should apply enough pressure thereon when attempting to pass the doffers, the beveled end of the doffers would ride down on the related drum 3 and slip the belts 22 or 23, thereby stopping the drum from rotating without injury to the parts.

Means are provided for moistening the picking fingers 25. As shown in FIGS. 4 and 5, moisture pads 39 are mounted on the separator 34 in relation to each horizontal row of picking fingers 25, said pads 39 being adapted to engage the picking fingers 25 of the related row as the rear drum 3 rotates; and disposed vertically within the separator 34 is a water pipe 40 having branches 41 extending therefrom through the adjacent wall of the separator 34 parallel with each of the moisture pads 39, said branches 41 being adapted to supply water to their related pads 39. The upper end of the vertical pipe 40 is supplied with water through a branch 42, FIGS. 4 and 5, connected to a water pipe 43, FIG. 4, which receives water from a suitable source of supply, such as a tank, located either upon the unit A or B, or upon the tractor T.

A similar arrangement of the moisture pads is arranged on the front plate 1f of each of the casings 1, as shown in FIG. 4, and the pads are supplied with water from vertical pipes 44 having branches 45 arranged similarly to the branches 41 of the rear pads 39 which cooperate with the row of picking fingers 25 of the rear drums of each casing, the pipes 44 being supplied with water through an extension of the water pipe 43 hereinbefore referred to. The moisture pads for the fingers 25 of the front drums of each unit are otherwise similar in all respects to the moisture pads 39 for the fingers 25 of the rear drums.

I do not limit my invention to the exact form shown in the drawings, for obviously changes may be made therein within the scope of the claims.

I claim:

1. In combination with a tractor having a power take-off shaft and a power lift-arm; a cottonpicker unit mounted on the tractor adapted to straddle a row of cotton plants and comprising a pair of spaced rectangular casings open at their opposed inner faces and closed on all other faces; vertically disposed rotatable front and rear drums journaled in each casing; vertical shafts in each casing journaled concentrically with their related drums; vertical series of spaced disks on said shafts within said drums; means operated by the power take-off shaft for rotating said drums and shafts of the unit; vertical series of horizontal rows of radially disposed picking fingers rotatably mounted in each drum, said fingers overlapping in staggered relation within the space between the casings of the unit; rollers on the inner ends of the respective fingers within the drums engaging their related disks for rotating the fingers; a vertical suction duct in each casing disposed at the outer wall thereof intermediate the front and rear drums, said suction duct having an open bottom end disposed above the bottom of the casing; a cotton receiving repectacle on the tractor; other ducts connecting the vertical ducts respectively with said receptacle; suction means in said other ducts; a separator in each casing disposed between and spaced from the fingers of the related front and rear drums and spaced laterally from the related vertical suction ducts; an arcuate rear wall in each casing spaced from the fingers of the rear drum and extending from the open face of the casing around to a point adjacent the vertical suction duct; rear doffers mounted on the separator adapted to remove the cotton from the fingers of the rear drum and to deposit same at the lower end of the vertical duct; and front doffers disposed adjacent the vertical duct and adapted to remove cotton from the fingers of the front drum and to deposit same at the lower end of the vertical duct.

2. In a combination as set forth in claim 1, said shafts being journaled in bearings at the tops and bottoms of the casings; and said drums having top and bottom plates through which said shafts extend, said plates being journaled on said shafts.

3. In a combination as set forth in claim 2, said drums having hollow stub shafts extending above the tops of the casings; belt pulleys mounted on the upper ends of said shafts and stub shafts of each casing; and said means for rotating the drums and shafts comprising a vertical jack shaft journaled in bearings on the rear end of the unit having a pair of belt pulleys disposed in the planes of the belt pulleys of the stub shafts and shafts respectively of said units; belts running around the belt pulleys respectively; and a flexible shaft connecting the power take-off shaft of the tractor and said jack shaft.

4. In a combination as set forth in claim 1, triangular guide plates disposed at the front of the casing of each unit adapted to guide the cotton plants of the row between the casings of each unit preparatory to the picking operation; the lower ends of said guide plates sloping upwardly in the forward direction.

5. In a combination as set forth in claim 4, springy guide rods secured at their front ends to the guide plates, said rods being rearwardly inclined and adapted to lift the lower portions of the cotton plants as they enter between the spaced casings.

6. In a combination as set forth in claim 1, said front separator being hollow and having substantially arcuate sides to clear the tips of the fingers carried by the front and rear drums, and having a side wall adjacent the suction duct substantially tangent to the periphery of the rear drum to which wall the rear doffers are mounted.

7. In a combination as set forth in claim 1, said unit being disposed at one side of the longitudinal axis of the tractor; lower brackets on the rear wall of the unit; a pair of pivoted parallel lower links connecting said lower brackets to the rear end of the tractor; and an upper bracket on the rear wall of the unit pivotally connected with the power lift-arm of the tractor above and between the lower links, whereby the unit may be raised or lowered on the tractor with respect to the ground surface.

8. In combination with a tractor having a power take-off shaft and a power lift-arm; a plurality of cottonpicker units mounted on the power lifting arm adapted to respectively straddle rows of cotton plants, each unit comprising a pair of spaced rectangular casings open at their opposed inner faces and closed on all other faces; vertically disposed rotatable front and rear drums journaled in each casing; vertical shafts in each casing journaled concentrically with their related drums; vertical series of spaced disks on said shafts within said drums; means operated by the power take-off shaft for respectively rotating said drums and shafts of each unit; vertical series of horizontal rows of radially disposed picking fingers rotatably mounted in each drum, said fingers overlapping in staggered relation within the space between the casings of each unit; rollers on the inner ends of the respective fingers within the drums engaging their related disks for rotating the fingers; a vertical suction duct in each casing disposed at the outer wall thereof intermediate the front and rear drums, said suction duct having an open bottom end disposed above the bottom of the casing; a cotton receiving receptacle on the tractor; other ducts connecting the vertical ducts respectively with said receptacle; suction means in said other ducts; a separator in each casing disposed between and spaced from the fingers of the related front and rear drums and spaced laterally from the related vertical suction ducts; an arcuate rear wall in each casing spaced from the fingers of the rear drum and extending from the open face of the casing around to a point adjacent the vertical suction duct; rear doffers mounted on the separator adapted to remove the cotton removed from the fingers of the rear drum and to deposit same at the lower end of the vertical duct; front doffers disposed adjacent the vertical duct and adapted to remove cotton from the fingers of the front drum and to deposit same at the lower end of the vertical duct; and means for moistening the fingers of the front and rear drums.

9. In a combination as set forth in claim 8, said shafts being journaled in bearings at the tops and bottoms of the casings; and said drums having top and bottom plates through which said shafts extend, said plates being journaled on said shafts.

10. In a combination as set forth in claim 9, said drums having hollow stub shafts extending above the tops of the casings; belt pulleys mounted on the upper ends of said shafts and stub shafts of each unit; and means for rotating the drums and shafts comprising a vertical jack shaft journaled in bearings on the rear end of the unit having a pair of belt pulleys disposed in the planes of the belt pulleys of the stub shafts and shafts respectively of said units; belts running around the belt pulleys respectively; and a flexible shaft connecting the power take-off shaft of the tractor and said jack shaft.

11. In a combination as set forth in claim 8, triangular guide plates disposed at the front of the casing of each unit adapted to guide and compress the cotton plants of the row between the casings of each unit preparatory to the picking operation; the lower ends of said guide plates sloping upwardly in the forward direction.

12. In a combination as set forth in claim 11, springy guide rods secured at their front ends to the guide plates, said rods being rearwardly inclined and adapted to lift the lower portions of the cotton plants as they enter between the spaced casings.

13. In a combination as set forth in claim 8, said separator being hollow and having substantially arcuate sides to clear the tips of the fingers carried by the front and rear drums, and having a side wall adjacent the suction duct substantially tangent to the periphery of the rear drum to which wall the rear doffers are mounted; and said finger moistening means for the rear drum comprising a vertical series of moistening pads for the respective vertical rows of fingers of the rear drum, said pads being mounted upon the front separator beyond the doffers; and a water pipe extending downwardly through the separator and having branches disposed beside and connected with and conducting water to each row of moistening pads.

14. In a combination as set forth in claim 8, said finger moistening means for the front drum comprising a vertical series of moistening pads for the respective vertical rows of fingers of the front drum, said pads being mounted upon the front wall of the casing beyond the front doffers; and a water pipe extending downwardly along said front plate and having branches disposed beside and connected with and conducting water into each row of moistening pads.

15. In a combination as set forth in claim 8, each unit being disposed at one side of the longitudinal axis of the tractor; lower brackets on the rear wall of each unit; a pair of pivoted parallel lower links connecting said lower brackets to the rear end of the tractor; and an upper bracket on the rear wall of the unit pivotally connected with the power lift-arm of the tractor above and between the lower links, whereby the unit may be raised or lowered on the tractor with respect to the ground surface.

16. A cottonpicker unit adapted to be mounted on a tractor and to straddle a row of cotton plants comprising a pair of spaced rectangular casings open at their opposed inner faces but closed on all other faces; vertically disposed rotatable front and rear drums journaled in each casing; vertical shafts in each casing journaled concentrically with their related drums; vertical series of spaced disks carried on said shafts within said drums; vertical series of horizontal rows of radially disposed picking fingers rotatably mounted in each drum, said fingers overlapping in staggered relation within the space between the casings of the unit; rollers on the inner ends of the respective fingers within the drums engaging their related disks for rotating the fingers; a vertical suction duct in each casing disposed at the outer wall thereof intermediate the front and rear drums, said suction duct having an open bottom end disposed above the bottom of the casing; a cotton receiving receptacle; other ducts connecting the vertical ducts respectively with the receptacle; suction means in said other ducts; a separator in each casing disposed between and spaced from the fingers of the related front and rear drums and spaced laterally from the related vertical suction ducts; an arcuate rear wall in each casing spaced from the fingers of the rear drum and extending from the open face of the casing around to a point adjacent the vertical suction duct; rear doffers mounted on the separator adapted to deposit cotton from the fingers of the rear drum at the lower end of the vertical duct; front doffers disposed adjacent the vertical duct and adapted to deposit cotton from the fingers of the front drum at the lower end of the vertical duct; and means for moistening the fingers of the front and rear drums respectively.

17. In a cottonpicker as set forth in claim 16, said drums having hollow stub shafts extending above the tops of the casing; belt pulleys mounted on the upper ends of said shafts and stub shafts of the unit; a vertical jack shaft journaled in bearings on the rear end of the unit having a pair of belt pulleys disposed in the planes of the belt pulleys of the stub shafts and shafts of said unit; and belts running around the belt pulleys respectively.

18. In a cottonpicker as set forth in claim 16, said separator being hollow and having substantially arcuate sides to clear the tips of the fingers carried by the front and rear drums, and having a side wall adjacent the suction duct substantially tangent to the periphery of the rear drum to which wall the rear doffers are mounted; and said finger moistening means for the rear drum comprising a vertical series of moistening pads for the respective vertical rows of fingers of the rear drum, said pads being mounted upon the separator beyond the doffers; and a water pipe extending downwardly through the front separator and having branches disposed beside and connected with and conducting water to each row of moistening pads.

19. In a cottonpicker as set forth in claim 16, said finger moistening means for the front drum comprising a vertical series of moistening pads for the respective vertical rows of fingers of the front drum, said pads being mounted upon the front wall of the casing beyond the front doffers; and a water pipe extending downwardly along said front plate and having branches disposed beside and connected with and conducting water to each row of moistening pads.

References Cited by the Examiner
UNITED STATES PATENTS

| | | | |
|---|---|---|---|
| 328,116 | 10/1885 | Haselton | 56—44 |
| 529,430 | 11/1894 | Todd | 56—44 |
| 1,161,611 | 11/1915 | Calderwood | 56—47 |
| 1,668,247 | 5/1928 | Morara | 56—44 X |
| 1,747,566 | 2/1930 | Berry | 56—14 |
| 2,672,001 | 3/1954 | Bopt et al. | 56—14 |

ANTONIO F. GUIDA, *Primary Examiner.*

RUSSELL R KINSEY, ABRAHAM G. STONE,
*Examiners.*